G. S. McGONEGAL.
NUT LOCK.
APPLICATION FILED JULY 5, 1916.
1,212,783.
Patented Jan. 16, 1917.
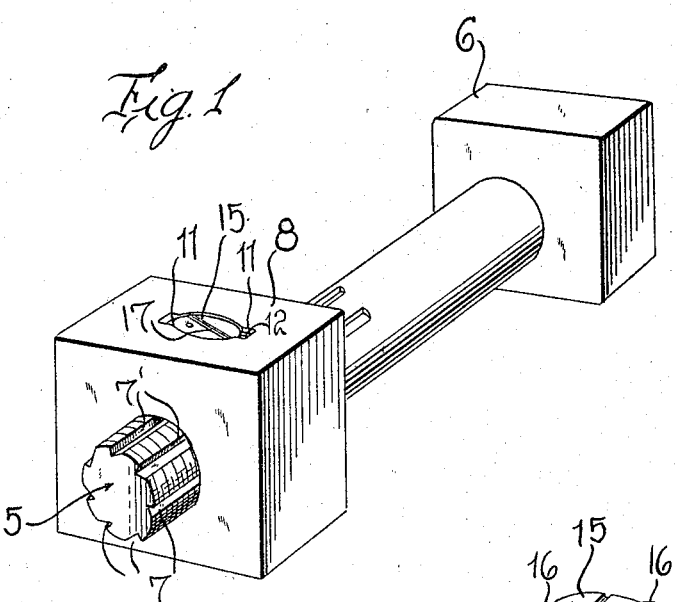
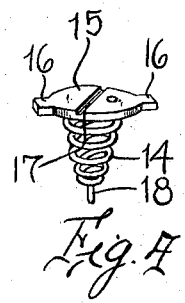
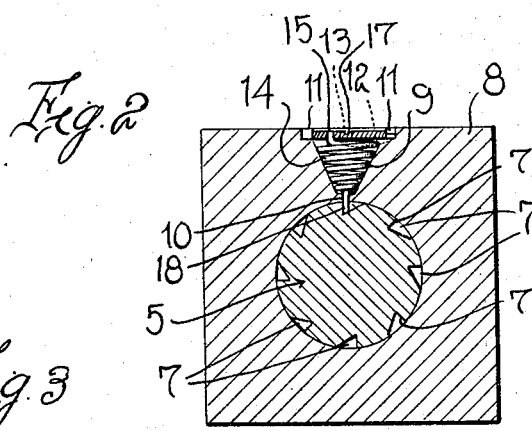
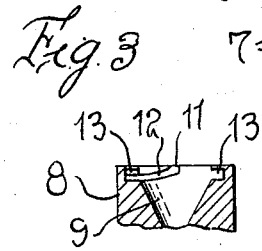
Inventor
G. S. McGONEGAL
By Watson E. Coleman
Attorney

UNITED STATES PATENT OFFICE.

GLENN S. McGONEGAL, OF WOODBURN, OREGON.

NUT-LOCK.

1,212,783.  Specification of Letters Patent.  Patented Jan. 16, 1917.

Application filed July 5, 1916. Serial No. 107,650.

*To all whom it may concern:*

Be it known that I, GLENN S. McGONEGAL, a citizen of the United States, residing at Woodburn, in the county of Marion and State of Oregon, have invented certain new and useful Improvements in Nut-Locks, of which the following is a specification, reference being had to the accompanying drawings.

This invention relates to an improved nut lock and has for its primary object to provide simple, efficient and durable means for securely locking a nut in its adjusted position upon the bolt.

It is another and more particular object of the invention to provide a nut lock wherein the bolt is provided with a series of longitudinal grooves in its periphery and the nut is formed with a deep tapering socket and an orifice at the base thereof leading to the bore of the nut, and means for detachably retaining a resilient locking element within said socket to project through the orifice and engage in one of the grooves in the bolt.

It is a further general object of my invention to provide a nut lock which may be cheaply manufactured and will enable the nut to be easily and quickly locked upon the bolt or removed therefrom.

With the above and other objects in view, my invention consists in the novel features of construction, combination and arrangement of parts to be hereinafter more fully described, claimed and illustrated in the accompanying drawing, in which, Figure 1 is a perspective view of a nut lock embodying my invention; Fig. 2 is an enlarged vertical section through the nut; Fig. 3 is a detail fragmentary section of the nut; and Fig. 4 is a detail perspective view of the locking device.

Referring in detail to the drawing, 5 designates the shank of the bolt which is threaded in the usual manner and has a head 6 formed upon one of its ends. The threaded periphery of the bolt shank 5 is provided with a plurality of spaced longitudinally extending grooves 7, each of which has a side wall, indicated at 7' which extends radially with respect to the center of the bolt shank, while the other base wall of the groove is inclined and merges into the periphery of the bolt.

The nut 8 has its threaded bore for coöperation with the threads on the bolt shank 5 in the usual manner and is provided in one of its side faces with a deep tapering socket 9, at the base of which an orifice 10 is formed in the nut leading to the bore thereof. In the face of the nut at diametrically opposite points on the edge of the socket 9, rectangular recesses 11 are formed from which the spiral grooves or threads 12 extend in relatively opposite directions through substantially ninety degrees along the wall of the socket 9 and at their other ends terminate in outwardly projecting channels 13 which do not open upon the side face of the nut.

The locking member consists of a coil spring 14 which is suitably fixed at one of its ends to a disk 15. This disk is provided at diametrically opposite points with laterally projecting lugs 16 and has a groove 17 formed in its end face to receive the bit of a screw driver. The other or smaller end of the spring 14 is axially extended to form a locking pin 18 which is loosely engaged in the orifice 10 in the nut and projects into the bore thereof.

In the use of the device, the disk 15 carrying the spring 14 is inserted into the socket 9 in the nut, the lugs 16 on said disk being engaged in the notches 11 in the face of the nut. The screw driver is then engaged with the disk 15 and the same forced inwardly and turned so that the lugs 11 will move to the closed ends of the grooves 12. When pressure upon the disk is released, the spring 14 acts to force the same outwardly and engage the lugs 11 with the end walls of the channels 13, whereby said disk is held against reverse turning movement. As will be seen from reference to Fig. 2, the nut may be readily turned on the bolt from left to right, the projecting pin 18 on the end of the spring riding over the beveled base walls of the grooves 7 in the bolt shank and being forced into the orifice 10 against the action of said spring. After the nut has been threaded to the desired position, and the pin 18 projected into one of the grooves 7 in the shank of the bolt, the reverse turning movement of the nut in a direction from right to left is effectually precluded, as said pin will contact or abut against the radial wall 7' of the groove. In this manner the nut is very securely held in its adjusted position and the possibility of the same working off of the bolt by vibration of the part secured thereby, is obviated.

From the foregoing description taken in connection with the accompanying drawings, the construction, manner of operation and several advantages of my invention will be clearly and fully understood. The device is exceedingly simple and durable, as well as effective in practical use and enables the nut to be very easily and quickly locked upon the bolt or removed. In the latter operation, it is only necessary to force the disk 15 inwardly and then turn the same so that the lugs on said disk may be moved out through the recesses 11. It is, of course, manifest that the device may be constructed in various sizes in accordance with the particular purpose for which the bolt is to be used. Various changes in the form, proportion and arrangement of the several parts may also be resorted to and I reserve the privilege of adopting all such legitimate changes as may be fairly embodied within the spirit and scope of the invention, as claimed.

Having thus described this invention, what is claimed is:—

1. In combination, a bolt provided in its periphery with a longitudinal groove, a nut threaded upon the bolt and having a socket in one of its side faces and an orifice at the base of the socket opening into the bore of the nut, a disk having diametrically opposed lugs, the wall of the socket in the nut being provided with opposed, spiral grooves to receive said lugs and recesses at one end of the groove in which the lugs have locking engagement, and a yieldable element carried by the disk and having a portion projecting through said orifice for locking engagement in the groove in the bolt.

2. In combination, a bolt having a plurality of spaced longitudinal grooves in its periphery, a nut threaded upon the bolt provided with a socket in one of its side faces, and an orifice leading from the socket to the bore of the nut, a disk, a coiled spring fixed to said disk, and having one of its ends axially projected to extend through the orifice in the nut and into engagement with one of the grooves in the bolt, and coacting means on the disk and the wall of said socket to detachably lock the disk within the socket.

In testimony whereof I hereunto affix my signature in the presence of two witnesses.

GLENN S. McGONEGAL.

Witnesses:
RAYMOND M. NEHL,
GROVE McGONEGAL.

Copies of this patent may be obtained for five cents each, by addressing the "Commissioner of Patents, Washington, D. C."